(12) United States Patent
Carothers et al.

(10) Patent No.: US 6,587,857 B1
(45) Date of Patent: Jul. 1, 2003

(54) SYSTEM AND METHOD FOR WAREHOUSING AND RETRIEVING DATA

(75) Inventors: Kevin Carothers, North Hills, CA (US); Lin-Chen Shih, Torrance, CA (US); Simon Khilkevich, Northridge, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/342,902

(22) Filed: Jun. 30, 1999

Related U.S. Application Data

(60) Provisional application No. 60/091,163, filed on Jun. 30, 1998.

(51) Int. Cl.[7] .................. G06F 17/30; G06F 15/173
(52) U.S. Cl. ..................... 707/102; 707/2; 707/10; 709/223
(58) Field of Search ................... 707/2, 3, 4, 5, 707/10, 102, 100, 101; 709/223

(56) References Cited

U.S. PATENT DOCUMENTS

| | | | |
|---|---|---|---|
| 4,845,709 A | * 7/1989 | Matsumoto | 370/86 |
| 5,101,402 A | 3/1992 | Chiu et al. | 370/17 |
| 5,315,580 A | 5/1994 | Phaal | 370/13 |
| 5,375,070 A | 12/1994 | Hershey et al. | 364/550 |

(List continued on next page.)

OTHER PUBLICATIONS

"An Overview of Data Warehousing and OLAP Technology," Mar. 1997, Technical Report MSR–TR–97–14 by Surajit Chaudhari of Microsoft Research and Umeshwar Dayal of Hewlett–Packard Labs.

(List continued on next page.)

Primary Examiner—Frantz Coby
(74) Attorney, Agent, or Firm—Kilpatrick Stockton LLP; George T. Marcou

(57) ABSTRACT

A system and method for preparing and integrating operational data received from nodes on a network prior to loading the data onto a data warehouse. Operational data received from nodes on a network is transformed to produce an output file of integrated data records which are audited to ensure data contained in the records has not already been loaded to the data warehouse in a previous operation. Data previously loaded onto the data warehouse is compared with current operational data to be loaded to determine whether the status of any nodes in the network has changed. The audited integrated operational data and data indicating which nodes, if any, have changed status since the previous upload of data are provided with unique identification numbers and uploaded to the data warehouse. In a preferred embodiment, the data concerns transactions occurring on, and the status of, components in customer activated terminals or transactions occurring on home banking servers. Once uploaded to the data warehouse, data may be viewed graphically by an end user querying the data warehouse.

13 Claims, 6 Drawing Sheets

U.S. PATENT DOCUMENTS

| | | | |
|---|---|---|---|
| 5,519,689 A | 5/1996 | Kim | 370/17 |
| 5,542,047 A | 7/1996 | Armstrong | 395/200.11 |
| 5,613,100 A | 3/1997 | Anezaki | 395/500 |
| 5,629,927 A | 5/1997 | Waclawsky et al. | 370/253 |
| 5,675,785 A | 10/1997 | Hall et al. | 395/613 |
| 5,687,361 A | 11/1997 | Sarkar | 395/601 |
| 5,691,917 A | 11/1997 | Harrisoin | 364/514 |
| 5,692,181 A | 11/1997 | Anand et al. | 395/613 |
| 5,701,453 A | 12/1997 | Maloney et al. | 395/602 |
| 5,710,755 A * | 1/1998 | Chen | 370/24 |
| 5,721,903 A | 2/1998 | Anand et al. | 395/605 |
| 5,751,698 A | 5/1998 | Cushman et al. | 370/252 |
| 5,781,735 A | 7/1998 | Southard | 395/200.54 |
| 5,781,911 A | 7/1998 | Young et al. | 707/201 |
| 5,794,234 A * | 8/1998 | Church et al. | 707/4 |
| 5,818,725 A | 10/1998 | McNamara et al. | 364/483 |
| 5,822,535 A | 10/1998 | Takase et al. | 395/200.56 |
| 5,872,911 A | 2/1999 | Berg | 395/183.19 |
| 5,878,420 A | 3/1999 | de la Salle | 707/10 |
| 5,889,954 A | 3/1999 | Gesses et al. | 395/200.53 |
| 5,889,992 A * | 3/1999 | Koerber | 707/103 |
| 6,105,122 A * | 8/2000 | Muller et al. | 712/1 |
| 6,157,411 A * | 12/2000 | Williams et al. | 348/552 |
| 6,178,418 B1 * | 1/2001 | Singer | 707/3 |
| 6,363,391 B1 * | 3/2002 | Rosensteel, Jr. | 707/102 |

OTHER PUBLICATIONS

"The Data Warehouse Toolkit: Practical Techniques for Building Dimensional Data Warehouses," Chapters 6–9, by Ralph Kimball, Feb. 1996.

"Surrogate Keys—Keep control over record identifiers by generating new keys for the data warehouse" by Ralph Kimball—Data Warehouse Architect, DBMS Online, May 1998.

"Understanding the Complexities and Resource Requirements Involved in a Quality Data Conversion—Converting Data for Warehouses" by Kathy Bohn, DBMS Online, Jun. 1997.

* cited by examiner

SYSTEM AND METHOD FOR WAREHOUSING AND RETRIEVING DATA

This application is a continuation of, and claims priority to, abandoned U.S. provisional patent application Serial No. 60/091,163 filed Jun. 30, 1998, which is incorporated herein by reference.

FIELD OF THE INVENTION

This invention relates to methods, apparatus and systems for monitoring the activity of nodes on a network, storing data relating to the activity of those nodes in a data warehouse, and providing access to the data through customizable queries. More specifically, this invention relates to methods and systems for transforming data obtained from nodes on a network prior to loading that data into a data warehouse.

BACKGROUND

Businesses can gain a competitive advantage by using and analyzing strategic data relating to their businesses. Analysis of such data allows managers to make better and more timely decisions, leads to a better understanding of the business, and improves support for customers, all of which ultimately lead to growth. However, basing decisions on data relating to a business requires storing tremendous volumes of data. For example, multi-national companies have networks with nodes located across the globe that generate megabytes of data on an hourly basis. More specifically, banks continuously generate megabytes of data relating to activities of Customer Activated Terminals (CATs), Automated Teller Machines (ATMs), or home service delivery systems, among other activities. Due to the tremendous volume of data which a business may generate during the course of a day, many businesses are opting to store business data in data warehouses.

A data warehouse is a storage and retrieval system capable of storing vast amounts of data. More specifically, a data warehouse is a subject oriented, integrated, time-variant, nonvolatile collection of data used to support business managers' decision making process. Thus, data warehouses support informational (i.e., DSS—decision support) processing by providing a solid foundation of integrated corporate wide historical data from which to perform management analysis.

Data warehousing has become increasingly reachable, both economically and technically to many, if not most businesses. Large multi-national concerns that engage in literally millions of business transactions in a very short period of time have a need to store and view information relating to those transactions so that they can make decisions that will enhance their business. Just a few years ago, the massive database queries required for millions of business transactions taxed all but the world's largest computers and database systems to the point of being unusable. Today, that is not at all the case. Specialized "niche" market relational database management system (RDBMS) engines for data warehousing have been developed and are readily available at low prices. Multi-processor server hardware machines are available for under the five-figure mark and massive storage devices are also spiraling downward in price.

A data warehouse is always a physically separate store of data transformed from the application data found in the operational environment. One of the most important aspects of the data warehouse environment is that data found with in the data warehouse is integrated. This integration requires that whatever the source or sources of the data that is eventually stored in the data warehouse, the data must arrive in the data warehouse in a consistent integrated state. Therefore, before data is loaded into a data warehouse, the data must be transformed to the data warehouse format. There after, there are normally only two kinds of operations that occur in the data warehouse the loading of data after it is transformed and the access of data.

Once data is loaded into a data warehouse, end users may access the data using a separate application program or through an interface provided as part of the database system software. Some refer to these as discovery tools. Discovery tools are used to retrieve, analyze and present data from data warehouses. Tools used can range from very complex modeling tools to relatively simple end user query tools designed to do no more than mask the complexity of the structured query language (SQL) programming language from the user. Automated tools that search data for trends or relationships may also be used.

Accordingly, there is a need for methods and systems to effectively and efficiently transform data obtained from nodes on a network. Specifically, there is a need to transform operational data into integrated data before uploading such data into a data warehouse.

There is an additional need to transform data obtained from customer activated terminals (CATs) networked together such that the data obtained is integrated prior to loading it into a data warehouse. There is also a need to transform and integrate operational and transaction data obtained from automated teller machines (ATMs) prior to uploading such data into a data warehouse.

There also is a need to transform transactional and/or operational data obtained from networks providing services to customers' homes prior to loading such data into a data warehouse. More specifically there is a need to integrate data relating to transactions occurring on home banking servers prior to loading that data into a data warehouse.

SUMMARY OF THE INVENTION

It is an object of the invention to meet these needs, and others, through a method and system for warehousing data obtained from nodes on a network.

It is a further object of the present invention to provide business decision makers and managers the ability to better define their customer base, analyze trends, and better serve those having a relationship with the corporate entity.

It is a further object of the present invention to provide a system that can be deployed on many different machines and platforms.

It is another object of the present invention to provide a data warehouse that can store more than a terabyte of data, making full use of multi-processor computer and redundant arrays of inexpensive disk (RAID) technologies to deliver decision support data as fast as possible.

It is a further object of the present invention to provide a global product targeted to be deployed both domestically and internationally to serve as a window into a network so that such fundamental questions such as how CATs and/or ATMs are used and how to better serve home banking users can easily be answered.

It is yet another object of the present invention to provide a system and method for transforming data obtained from an operational environment so that it may be uploaded into a data warehouse.

It is a further object of the present invention to provide a system and method for transforming data obtained from nodes on a network before uploading the data into a data warehouse.

It is also an object of the present invention to provide a system and method for transforming operational and transactional data obtained from CATs on a network before uploading that data into a data warehouse.

It is a further object of the present invention to provide a system and method for transforming operational and transactional data obtained from ATMs connected to a network prior to loading the data into a data warehouse.

It is another object of the present invention to provided a system and method for transforming data obtained from servers providing access to services to customers at sites distant from the service provider prior to loading that data into a data warehouse. For example, it is an object of the present invention to provide a system and method for transforming and integrating data obtained from home banking servers prior to uploading such data into a data warehouse.

The present invention comprises a method and system for integrating operational data received from nodes on a network prior to loading the data into a data warehouse.

To achieve the stated and other objects of the present invention, as embodied and described below, the invention includes a method for preparing and uploading data into a data warehouse comprising the steps of: obtaining a set of data from nodes on a network relating to the operation of and transactions occurring on each node and the operation of each node component in elementized message format; storing the set of data obtained as a series of records; transmitting the stored set of data to a data warehouse processor; transforming the transmitted set of data into data base formatted records wherein said transforming step is comprised of: determining time zone information for data obtained from each node in the network; rejecting node data having invalid syntax; reporting rejected node data in an audit error log file; calculating the local time associated with data obtained from each node by referencing a time zone table; verifying the data associated with each node by referencing a mnemonic table containing the location of individual node devices by number, name and mnemonic; determining whether any data relating to a transaction is an orphan; computing the total elapsed time for each transaction; writing the transformed data into an output file comprised of records; auditing the transformed data contained in the output file wherein said transformed data auditing step is comprised of: verifying the existence of templates, an audit initialization file, and the data warehouse calculating the number of records contained in the transformed data; determining the beginning and end times for the set of data obtained from the nodes on the network; determining a load control key by querying the data warehouse for the previous load control key and incrementing the result of the inquiry by one unit; querying the data warehouse to determine whether records currently being audited have previously been uploaded to the data warehouse; building a load control table management utility containing all of the instructions necessary for undertaking the current data base load; assigning a unique identification number to each record in the transformed set of data; building a node table management utility for loading data into the data warehouse and associating a load identification number with the transformed set of data; providing an error notification if a record in the transformed set of data was previously loaded into the data warehouse; loading the unique identification number assigned to each record in the transformed set of data and the transformed data into the data warehouse; generating records reporting the availability of nodes on the network and node components wherein said generating step is comprised of: obtaining the previous status of nodes and node components; comparing the current status of nodes and node components with their previous status; determining whether the current status of each node in the network or each node component has changed from the previous status of the node or node component; determining the length of time each node and each node component has been in its current state; forming an output file containing the current status of each node component, whether the current state of each node component is different from the status recorded for that node during a previous upload and how long the node component has been in its current state; auditing records reporting the availability of nodes on the network and node components wherein said record availability auditing step is comprised of: counting the number of records reporting the availability of nodes on the network and node components; counting the number of node components that have changed status from their previous states; determining the earliest and latest time for the set of records reporting the availability of nodes on the network and node components; assigning a unique load identification number to the number of records reporting node availability, the number of nodes having changed status and the earliest and latest time for the set of records reporting node availability; producing a load control table management utility providing a set of instructions for loading audit information concerning the records reporting the availability of nodes on the network and node components; producing a load control table management utility providing a set of instructions for loading the records reporting the availability of nodes on the network and node components; and loading the number of records reporting node availability, the number of nodes having changed status, and the earliest and latest time for the set of records reporting node availability and the load control identification number to the data warehouse.

To achieve the stated and other objects of the present invention, as embodied and described below, the invention includes a system for preparing operational data for upload to a data warehouse comprising: an integrated network control computer connected to a network having nodes processing transactions for retrieving and storing data relating to transactions occurring on the nodes; and a data warehouse connected to the integrated network control computer; said data warehouse having a data processor for receiving, transforming, and auditing the data relating to transactions occurring on the nodes.

Additional objects, advantages and novel features of the invention will be set forth in part in the description that follows, and in part will become more apparent to those skilled in the art upon examination of the following or upon learning by practice of the invention.

DETAILED DESCRIPTION

Figure 1:
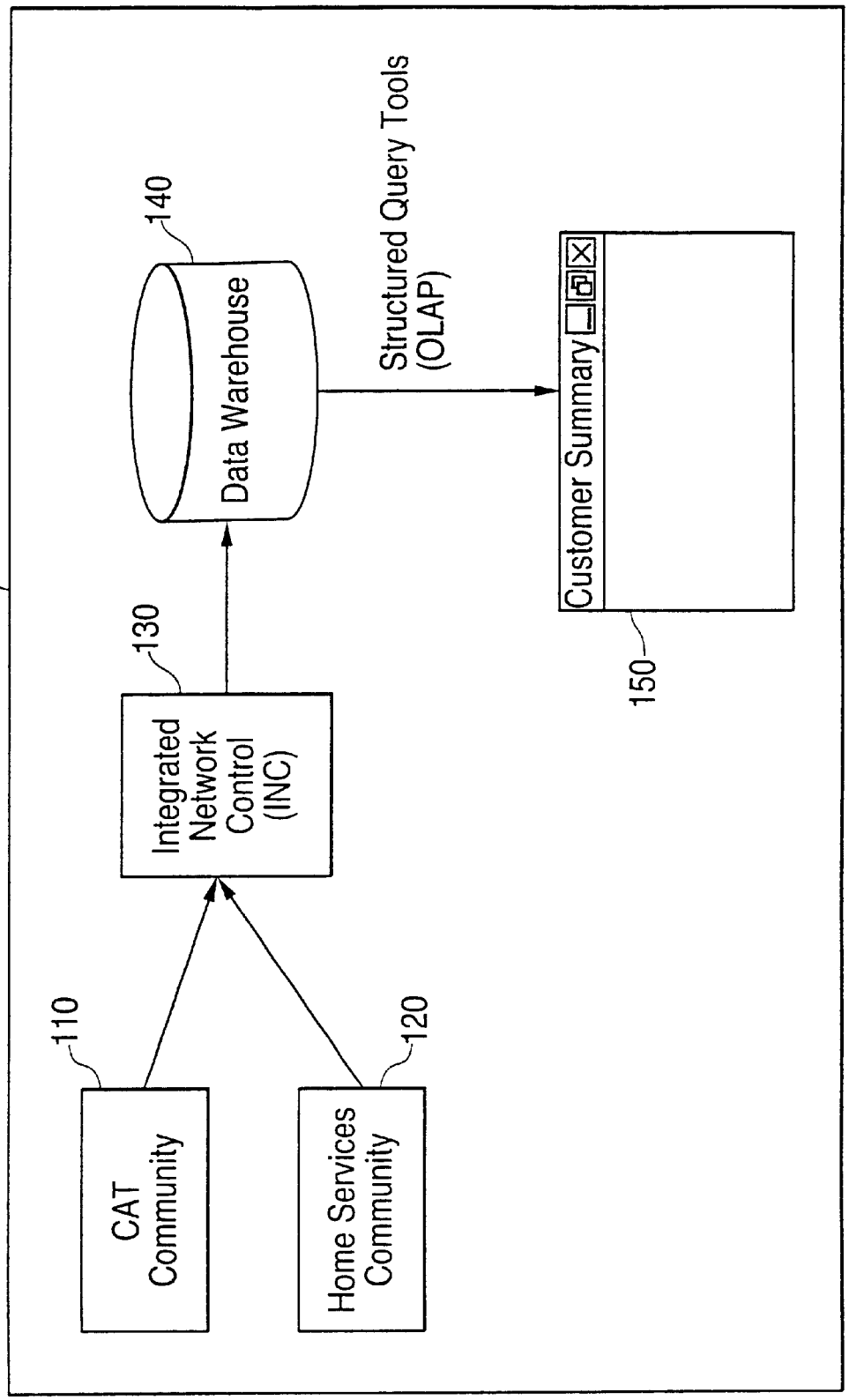
FIG. 1 depicts the architecture of a system employing the invention.

The present invention comprises a method and system for warehousing data obtained from nodes on a network. FIG. 1 illustrates the architecture of system 100, the preferred embodiment for uploading data into and retrieving data from data warehouse 140. Nodes on networks, such as Customer Activated Terminals (CATs) Community 110 and Home Services Community (HSCs) 120, are connected to integrated network control computer (INC) 130. In a preferred embodiment, CATs 110 consist of Automated Teller Machines (ATMs). Data relating to the operation of, and transactions occurring on, each CAT is sent to and stored in INC 130 periodically, as determined by a data base administrator (DBA). The software logical device driver of the CATs, Apps Monitor, and Integrator processes send Customer Interface Unit (CIU) Device Status messages and host/customer activity messages in Elementized Message (ELF) format to INC 130. INC 130 may also be connected to HSCs network 120 which transmits data relating to transactions processed by home service banking networks periodically, as determined by the DBA. In a preferred embodiment, HSCs network 120 consists of home banking servers which transmit data relating to home service transaction logs to INC 130.

INC 130 may be comprised of a processor having random access memory, hard drive storage, and internal CD-ROM drive, a 3.5" 1.44 megabyte internal floppy drive, HSI ports supporting 64 KB throughput, a serial port, along with ethernet and SCSI ports. INC 130 has the ability to determine whether a CAT is up, down, in or out of service. In addition to collecting data from CATs 110 regarding the CATs' components and transactions processed by them, INC 130 also has the ability to instruct individual CATs 110 to go on- or off-line. Thus, INC 130 has a master-slave relationship with CATs 110 to which it is connected.

INC 130 is connected to and transmits data to data warehouse 140. Data warehouse 140 stores all business information and meta data uploaded by INC 130. Data warehouse 140 can reside on a server machine loaded with Microsoft Windows NT Server. Data warehouse 140 can also be a fully-functional web-server. Data warehouse 140 may also reside on a Sun Solaris machine loaded with Netscape Commerce Server. Web server software will be installed on data warehouse 140. A large majority of user interaction with data warehouse 140 may be through the internet. An end user work station (not shown) is connected to data warehouse 140. The end user work station allows an end user to use SQL tools to query data warehouse 140 to produce reports 150 which may consist of text or graphical representations upon which business managers may base their decisions. All data warehouse 140 queries can be returned back to the user in the form of HTML encoded web pages.

When system 100 is installed and operational, a program residing on a data warehouse processor (not shown) will periodically gather data from INC 130, for example, CAT device, customer, and/or home banking server information. This program will then integrate the information contained within these logs and load it into data warehouse 140. The DBA will be able to set the desired times for "pickup," as well as the desired source and destination of the data retrieved by INC 130.

Figure 2:
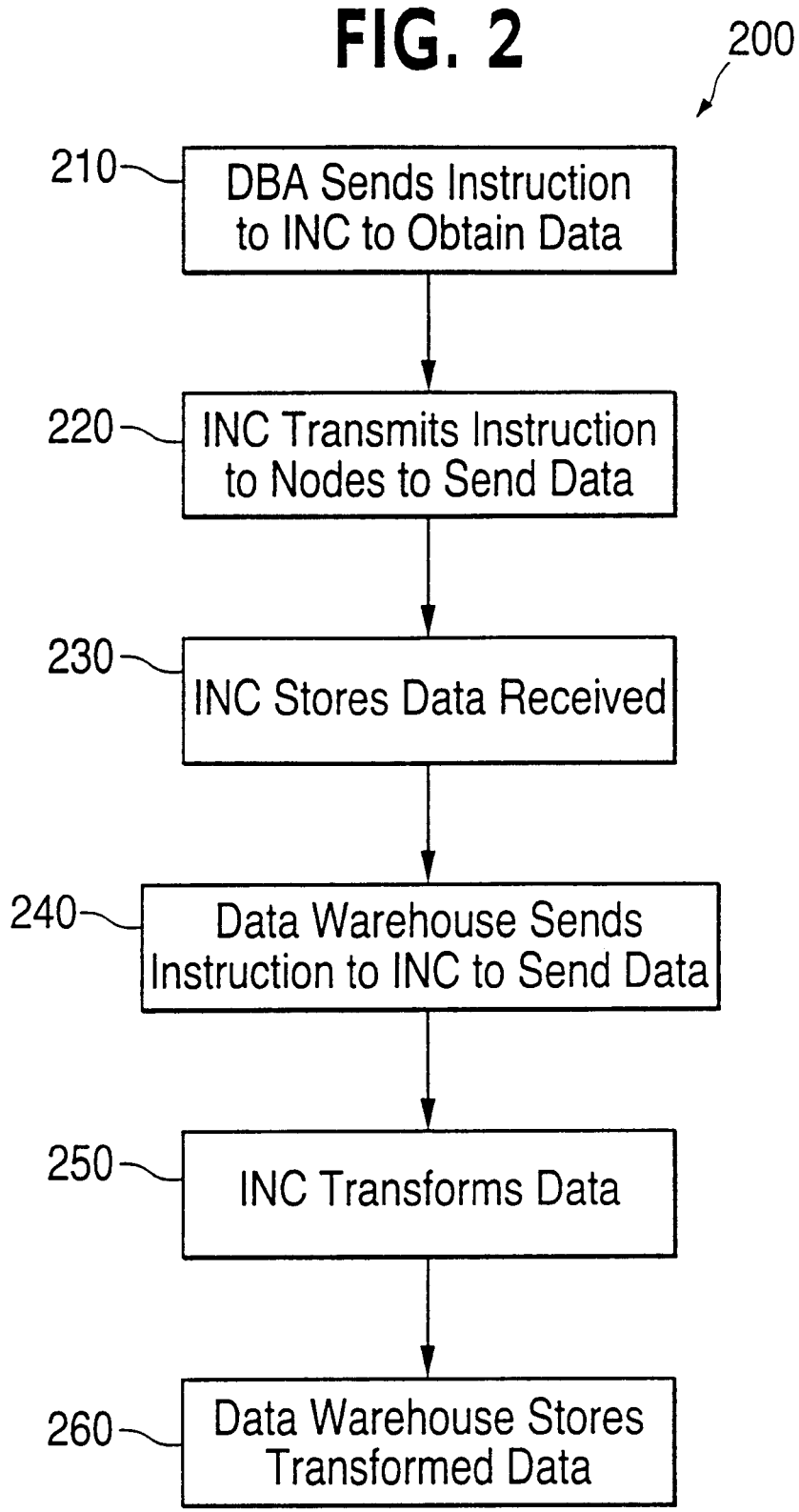
FIG. 2 is a flow diagram illustrating the process performed by the system illustrated in FIG. 1.

FIG. 2 illustrates loading process 200 that is performed by the application program residing on the data warehouse processor. In step 210 a data base administrator, using a work station connected to data warehouse 140, transmits a command to INC 130 to gather data from nodes on a network, for example, CATs Community 110. In step 220, INC 130 transmits instructions to each node on the network to send data to INC 130. Data received from CATs Community 110 includes data relating to components or devices the node is comprised of and/or transactions which occurred on the node during a specified period of time. Data received from HSC includes data relating to transactions which took place over the home bank services network. INC 130 stores data received from the nodes in step 230. In step 240, a data base administrator transmits an instruction from data warehouse 140 to INC 130 to send the data stored in INC 130 to data warehouse 140. In step 250, the processor connected to data warehouse 140 processes the data requested by data warehouse 140 and, in step 260, transmits the processed data to data warehouse 140 where it is stored.

Data warehouse 140 can acquire the logs from INC 130 via a batch or demand process. The communications link in this procedure can be a TCP/IP interconnection between INC 130 and the data warehouse host computer (not shown). This data will then be "filtered" (cleansed) and processed to conform to data warehouse 140 schema rules and stored on the physical data warehouse Database Management System (DBMS). A secure, password-enabled procedure allows the warehouse administrator to set the time, time interval, and target for picking up the CAT/CIU information from INC 130.

Figure 3:
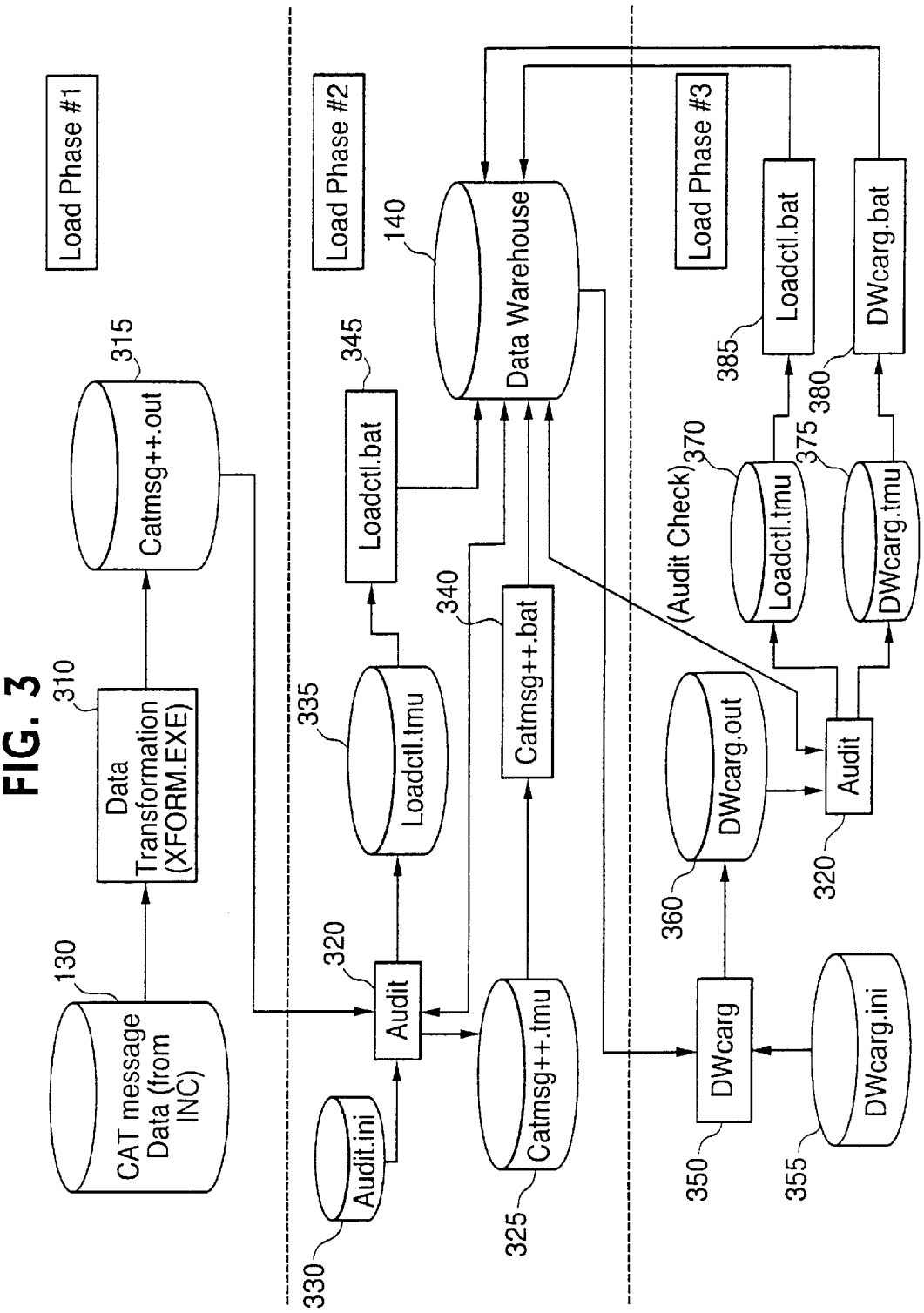
FIG. 3 illustrates the architecture of the system and method for loading data retrieved from nodes on a network into a data warehouse.

As noted above, before data stored in INC 130 can be uploaded to data warehouse 140, it must be processed. Among other things, the processing transforms the raw data stored in INC 130 into data base formatted records and provides a unique identifier for each and every record in the data base. In other words, each CAT session and log on is identified with a unique key. As illustrated in FIG. 3, the processing that must be performed on the data before loading it into data warehouse 150 is comprised of three phases.

In phase one, information is collected from each INC 130 that is known to data warehouse 140 and processed by data transformation application 310 which resides in the data warehouse processor. Data transformation application 310 processes raw data received from individual INCs 130 and transforms that data into a database formatted record. Transformation application 310 saves the transformed records in a separate file of database records, shown as Catmsg++.out 315 in FIG. 3.

Figure 4:
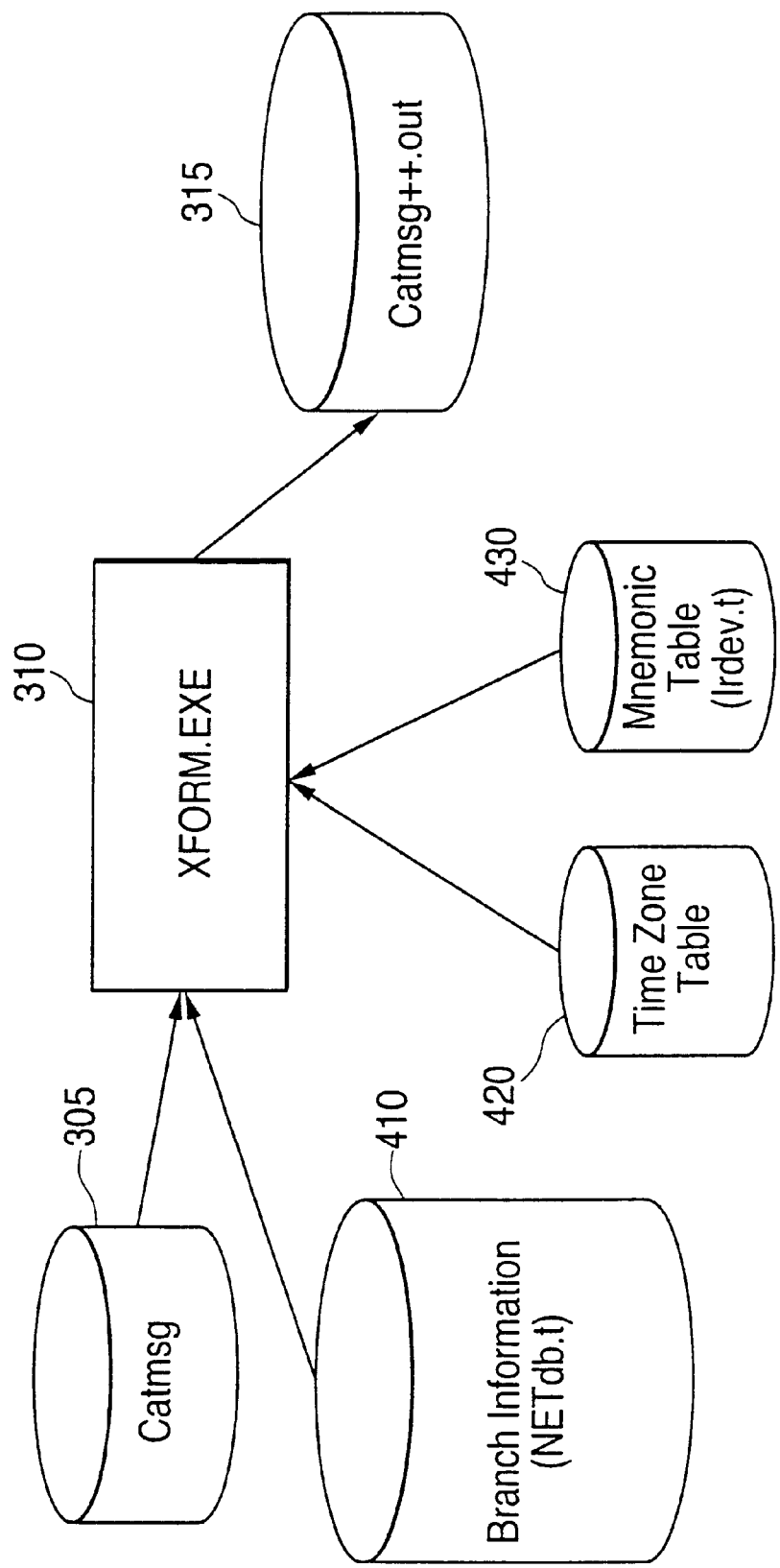
FIG. 4 illustrates the architecture of the system and method for transforming data received from network nodes.

FIG. 4 illustrates the architecture of transformation application 310. When transformation application 310 is launched, CAT message data 305 is received from INC 130. The time zone of the information to be loaded from an individual node is determined using branch information 410. Transformation application 310 will accept data relating to each individual node in a network in the form of a flat text file. In a preferred embodiment the format for this flat text file is as follows:

<category>|<date>|<time>|<node>|<ciu>|<termid>|
    <class>|<err code>|<msg text>|<branch>|<buscode>

If any of the fields in these records are invalid in syntax, they are "rejected," and reported in a log specified in an audit error log file.

Transformation application 310 will also use branch information 410 to look up the time zone of the node for the current record it is processing. Transformation program 310 will compute the local time of the node by adding or subtracting the appropriate time quantum from the INC local time (i.e., the time stamp of the message). Transformation application 310 determines the appropriate time quantum by referencing time zone table 420. For example, each node in CAT community 110 may store the time at which transactions are initiated at the node in Greenwich mean time (GMT) along with the number of hours the particular node is offset from GMT in time zone table 420. Using the GMT at which the transaction occurred and the number of hours a particular node is offset from GMT, transformation application 310 can calculate the local time at which the transaction occurred.

Transformation application 310 then verifies the data received from INC 130 by extracting characters from the message text and looking up the mnemonic from mnemonic table 430 which contains the location of individual node devices by number, name and mnemonic.

Finally, transformation application 310 will write the transformed records into an output file, shown as CATmsg++.out 315 in FIG. 3. The record format of this file may be as follows:

<msg_key>|<msg_category>|<msg_date_inc>|<msg$_{13}$ date_local>|<msg_time_local>|<msg_node>|<msg ciu>|<msg_class>|<msg_err$_{13}$ key>|<msg_text>|<msg_branch>|<msg_bus_code>|<Load ID>

Transformation application 310 will provide the data for all fields noted above except for the Load ID field which will be computed by audit application 320 (discussed below).

In essence, transformation application 310 combines several fields, for example, the session date and time, the terminal and session ID, and server ID, into a single large editor. Transformation application 310 adds a key which is a unique identifier to every transaction and session. Other activities occurring during transformation include computing total elapsed time for all sessions and transactions. Transformation application 310 can also determine whether a transaction is banking related or if a transaction is an orphan (meaning there is no session log recorded for the transaction). The transformation process can be the same for ATMs and home banking.

Upon successful completion of transformation application 310, audit application 320 will be run in phase two of the data warehouse load procedure. Audit application 320 may be written in visual basic or any other programming language. Audit application 320 ensures all nodes are responding to the DBA's instruction to send data or that the DBA has collected information from each and every INC 130. However, the main processing operation of audit application 320 is to verify that a load operation does not over write any data already existing in data warehouse 140. Audit application 320 also calculates how many valid records were contained in the file uploaded from INC 130 and computes the new load control key. The new load control key is computed by reading the database with an SQL inquiry. In other words, data warehouse 140 is queried for the last key assigned to previously uploaded data. The value received in response to the inquiry is incremented by one unit and used as the new load ID. Audit application 320 will then build the actual record and produce load control table management utility 335 and CAT message table management utility Catmsg++.out 325. Each record in a load is also uniquely identified by parameters such as the node ID, date, and time which the data in the particular record concern.

Audit application 320 begins by examining the first record and last record in the file received from INC 130 (i.e., Catmsg++.out file 315) for the beginning and end times of the data set that the system is preparing to load into data warehouse 140. Audit application 320 will set an internal "from_date" and "to_date" using the information obtained from the first and last records in the data set. Audit application 320 will then connect to data warehouse 140 and perform an SQL query effectively performing a summary check of whether data that it is attempting to load was previously loaded.

Figure 5:
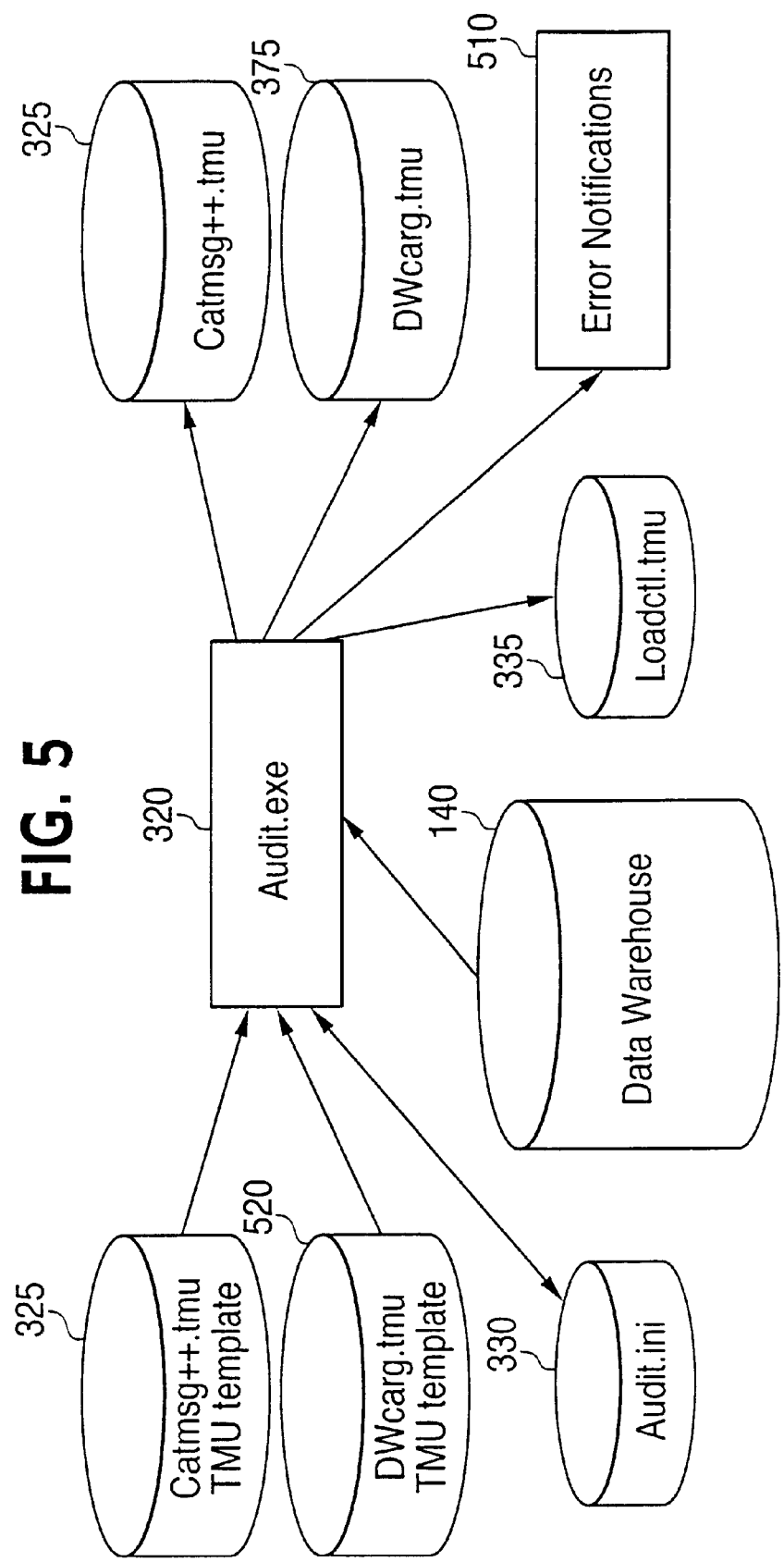
FIG. 5 illustrates the architecture of the system and method for auditing records received from network nodes.

The program architecture of audit application 320 is illustrated in FIG. 5. Initially, audit application 320 verifies the presence of templates 520, data warehouse 140 and audit initialization file 330. Audit initialization file 330 provides the descriptions of the input and output file names Catmsg++.out 335 and table management utilities 325 and 335, respectively. Audit initialization file 330 also describes parameters for logging into data warehouse 140. Audit initialization file 330 is the raw output produced by audit application 320 and is loaded into data warehouse 140. Thereafter, a database report may be run to show all of the audit information for a particular time period and indicate which, if any records are missing.

Audit application 320 builds a load control table management utility, shown as Loadctl.tmu 335 in FIGS. 3 and 5. Load control table management utility 335 contains all of the necessary instructions for undertaking the current data base load. Load control table management utility 335 also contains a detailed description of the contents of what is about to be loaded into data warehouse 140 and assigns a unique identifier to each load placed into data warehouse 140. Load control records may include the following fields: a unique identifier for each record (also referred to as a key), the date the record was generated, time the record was generated, the file size of load into data warehouse 140, type of records loaded, the INC node name (hostname), beginning date of the record set, the ending date of the record set, among others.

Audit application 320 dynamically builds the table in management utility files such that the load identifier is built into the actual load of the records. A load control batch file, shown as Loadctl.bat 345 in FIGS. 3 and 5 actually loads data into data warehouse 140 by executing the load control table management utility file, Loadctl.tmu 335.

Audit application 320 also builds a CAT table management utility illustrated as CATmsg++.tmu 325 in FIGS. 3 and 5. The CAT table management utility is a set of commands that the data warehouse engine will also use for loading data into data warehouse 140. It will have a built-in identifier tagging this set of records to the load control ID.

As noted above, audit application 320 checks record sets transmitted to it and determines if those records have already been loaded into data warehouse 140. If a record set has already been loaded into data warehouse 140, audit application 320 will exit and provide error notification 510. The results of audit application 320 are interpreted by the CAT and Data Warehouse CAT Device Availability Record Generation (DWCarg) (discussed below) table management utility batch files, shown as CATmsg++.bat 340 and DWCarg.bat 380 in FIG. 3. Based on the output of audit application 320, these batch files determine the next step in the data warehouse load process.

Upon successful completion of audit application 320, data in CATmsg++.out 315 is loaded into data warehouse 140 via CATmsg++.bat 340. Thereafter, Loadctl.bat 345 will add an audit record to data warehouse 140.

Figure 6:
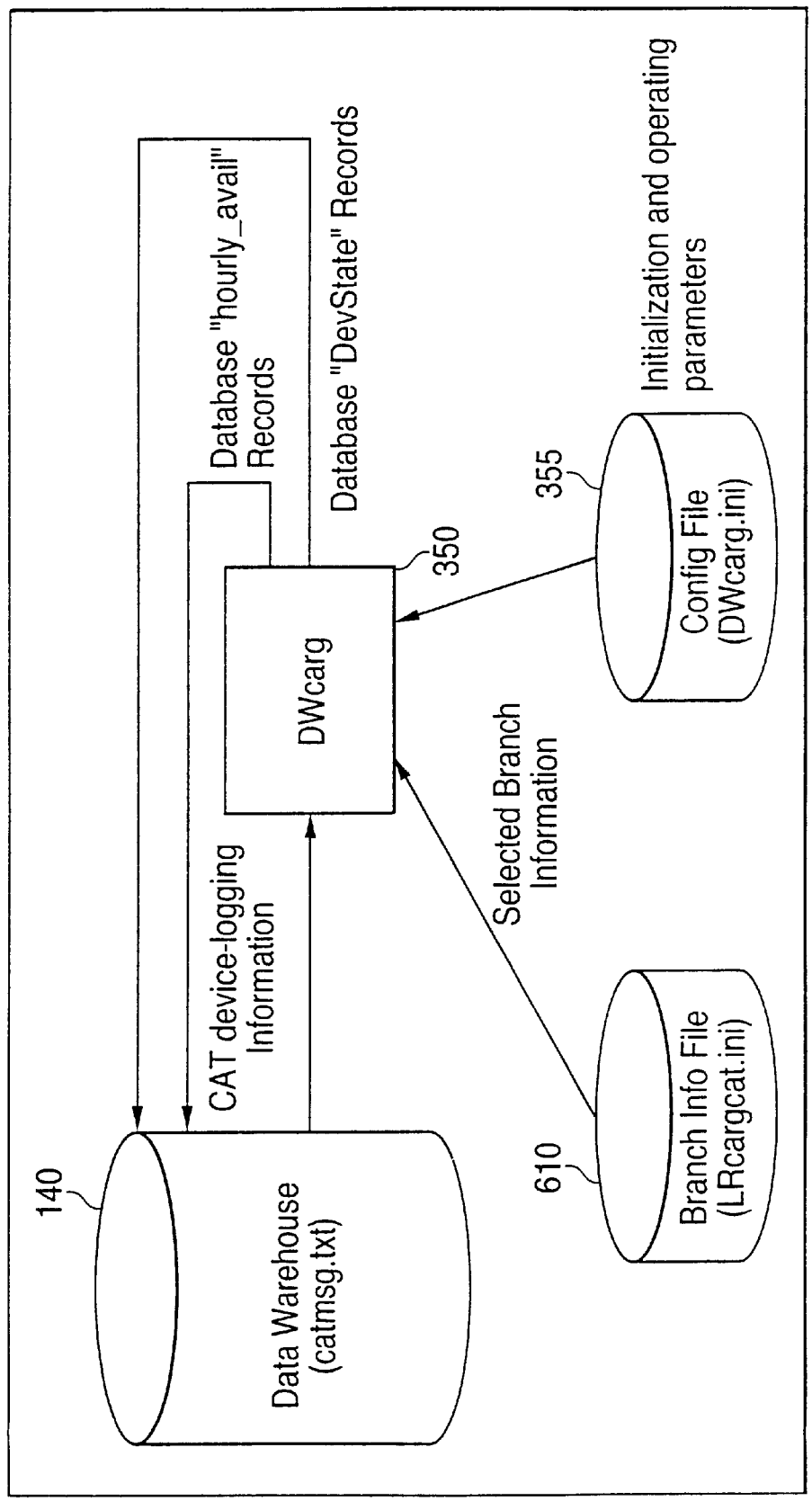
FIG. 6 illustrates the architecture of the system and method for generating data warehouse customer activated terminal availability reports.

After successful completion of phase 2, phase 3 provides the context for the data that is currently in the process of being uploaded to data warehouse 140. Data Warehouse CAT Availability Report Generator (DWCarg) application 350 generates records that are uploaded to data warehouse 140. DWCarg application 350 reports and uploads data regarding both CAT and CAT component availability to data warehouse 140. DWCarg application 350 uses existing sets of data warehouse CAT information to build a set of records providing the current availability of each CAT component. DWCarg application 350 also outputs CAT component state records, shown as DWCarg.out file 360 in FIG. 3. State records indicate the current status of each reporting device and the amount of time it has maintained that status. FIG. 6 illustrates the architecture of DWCarg application 350.

DWCarg initialization file 355 contains the status of all nodes for which data was received and previously uploaded to data warehouse 140. INC 130 provides network configuration data base branch configuration file 610 which provides the identifier for each node on in CAT community 110. Both DWCarg initialization file 355 and network configuration data base branch configuration file 610 are input to DWCarg application 350 which then compares the status of node components previously uploaded to data warehouse 140 to the status of node components as defined by the data most recently received from INC 130. As a result of this comparison, DWCarg application 350 determines whether any node component status has changed since the last time data was uploaded to data warehouse 140.

DWCarg application 350 produces records indicating the changed status of network nodes, if any, in DWCarg output file 360, illustrated in FIG. 3 as DWCarg.out 360. DWCarg output file 360 contains the current status of each node component, whether the current state of each node component is different from the status recorded for that node during the previous upload, and how long the node component has been in its current condition. The output of DWCarg application 350 may be used by an end user to produce time lines for each node component. End users can define what combination or groups of combinations of components result in an entire CAT as being tagged "unavailable." For example, an end user may define any three "critical" devices which, if any of all three are indicated as "down" from the messages received from the nodes, will mark the CAT as down. DWCarg application 350 can be implemented in Microsoft Visual Basic. However, the algorithms and functionality described are language independent.

The contents of DWCarg output file 360 are input to audit application 320. Audit application 320 is run again in phase three of the data warehouse load process. Although audit application 320 run in phase three is the same as that run in phase two, the inputs to audit application 320 in phase three are different from that in phase two. In phase three, DWCarg.out 360 is input to audit application 320. Audit application 320 counts the number of records in DWCarg.out 360, determines both the earliest and latest date and time of records contained in DWCarg.out 360, counts the number of components whose status has changed, and assigns another unique load identifier to this data. Audit application 320 does not modify DWCarg.out 360. Audit application then outputs load control table management utility 370 and DWCarg table management utility 375.

Load control table management utility 370, illustrated as Loadctl.tmu 370 in FIG. 3 is similar to load control management utility 335. Load control table management utility 370 provides the set of instructions for loading audit information output by audit application 320 in phase three into data warehouse 140. Load control batch file 385 actually loads the information into data warehouse 140 by executing the load control table management utility file 370.

Audit application 320 also produces DWCarg table management utility 375 which provides the set of instructions for loading DWCarg.out 360 produced by DWCarg application 350 into data warehouse 140. DWCarg batch file 380 executes the instructions in DWCarg table management utility 375 thereby ensuring DWCarg.out 360 is loaded into data warehouse 140.

DWCarg application 350 processes the inputs specified above and produces database records that, once loaded into data warehouse 140, can be queried. Reports which may be produced by data warehouse 140 end users include: a report of all CAT components which were down for a specific time range, a report of all down conditions that were not resolved by a specified time, a report of the total down time for a CAT at a particular node, a report of all node components that are currently down, a report of the percentage of time CAT components are down for a given day, among others.

Once uploaded, all data in data warehouse 140 will be stored in autonomous physical "segments." The reason for this is to keep as much of the database "queryable" at all times. For example, if a segment that contains CAT "down" messages needs to be taken "off-line" for backup, the rest of the database is still queryable. The data warehouse can also maintain CAT operational information which may be retrieved from INC 130.

The data warehouse also has intrinsic features which allow for the following: ability to "rollback" updates, ability to notify the end-warehouse of "missing" updates, ability to take CATs out of service, ability to produce a "catalog" of what is currently available to warehouse end-users, balancing mechanisms (balancing is the process of notifying the initiator of the data warehouse populate that the file was received and processed correctly), data loading procedures, determine loading faults, and determine loading security.

Data warehouse 140 may be implemented using hardware RAID (Redundant Array of Inexpensive Disks) level "0," which provides for "striped" storage, but not mirroring, shadowing, or hot-backups.

All aspects of the data warehouse system have secure access. This includes administration and user. Users have role-based access model, maintained at the warehouse machine. Specific roles that a user of the warehouse may have are Administrator, Branch Information, Regional Business Information User, and Global Business Information User.

The Administrator is an individual who has the capability of populating and maintaining database records. This is commonly referred to as the database administrator (DBA) account. This user has no inherent ability to access via query methods the data via OLAP and/or SQL tools.

One having access at the Branch Information level may access and run OLAP tools on information regarding activity at a particular branch. Customer-sensitive data, such as card number and name or location, may, or may not be granted, depending upon the privileges granted by the DBA. This type of user will not have administrative privileges.

A Regional Business Information has privileges similar to the Branch Information user above, but will be able to query information within a specified geographical region based on the Citibank Business Code. Customer-sensitive data may or may not be accessible to this type of user, depending upon permissions granted by the DBA.

A Global Business Information user has privileges similar to the Regional Business Information User above, but will be able to query information within all geographical Citibank Business Code Regions. Again, customer-sensitive data may or may not be accessible to this type of user, depending upon permissions granted by the DBA.

A Customer Sensitive Information user may access and run OLAP tools on information regarding customer-sensitive data, such as card number and name or location. This type of user has the ability to update and/or modify branch information. This type of user does not have administrative privileges.

A Home Services Information User is similar to a customer sensitive user, but has the ability to view/update all information regarding home services.

A CAT Device Administration User can access device availability and status information, but may not access customer-sensitive data fields.

Other roles, in addition to those above, may be defined.

A "Trusted" mode privileged password can be granted for branch, regional, and global users that will allow that use to connect to the database and use any OLAP tool set to extract any or all data given the regional basis of the account. The more typical use will be that of the end-user accessing the results of "canned" queries via a web browser.

The planned, and preferred method of delivering warehouse data to the end-users will be via internet/intranet web browsers.

By making the only form of database access via browser, the need for database field-level security requirements in design will be eliminated. Otherwise, an SQL user can connect to the warehouse database from the OLAP tool set, and potentially sensitive data could be disseminated to the wrong hands.

OLAP tools require extensive database knowledge. As a "quick-start," a Web-based HTML page offering a list of common queries will be provided. Other queries can be added to the set of available reports by the DBA as decision makers use and become accustomed to the system.

As mentioned, typical users of system 100 will access information stored in the data warehouse 140 via a web browser. Upon valid user name and password entry, an HTML page is presented in the web browser that displays the various queries available for the given account.

Once the query has been selected and submitted to the Internet Web server, the request is sent to the data warehouse software for the "fetch" of the canned query information. These canned queries are updated nightly as part of the database loading batch cycle. All data warehouse queries will be returned back to the user in the form of HTML encoded web pages.

Embodiments of the present invention have now been described in fulfillment of the above objects. It will be appreciated that these examples are merely illustrative of the invention. Many variations and modifications will be apparent to those skilled in the art. In addition, the order in which steps are presented in the method claims should not be construed as the sequence in which the method steps must be performed. It will be appreciated that the steps of the methods disclosed may be performed in a variety of sequences and, yet, obtain the same result.

What is claimed is:

1. A process for preparing data for upload to a data warehouse comprising the steps of:

transmitting data from nodes on a network relating to an operation of each node and an operation of each node component;

storing data obtained from the transmitted data as a series of records;

verifying the data related to each node by referencing a mnemonic table;

determining whether data relating to a transaction is an orphan;

computing the total elapsed time for each transaction;

writing the data into an output file;

determining time zone information for each record in the series of records; and calculating the local time associated with data obtained from each node by referencing a time zone table.

2. The process for preparing data for upload to a data processor as recited in claim 1, further comprising the steps of:

rejecting node data having invalid syntax; and reporting rejected node data in an audit error log file.

3. A process for preparing data for upload to a data warehouse comprising the steps of:

transforming a set of data comprised of several records relating to nodes on a network;

calculating a number of records contained in the set of transformed data;

calculating a load control number for uniquely identifying the set of transformed data;

querying the data warehouse to determine whether any records in the set of transformed data have previously been uploaded to the data warehouse; and building table management utilities for uploading the set of transformed data to the data warehouse.

4. The process for preparing data for upload to a data warehouse as recited in claim 3, wherein the building step includes building a load control table management utility and building a node management table utility.

5. The process for preparing data for upload to a data warehouse as recited in claim 4, further comprising the step of assigning a unique identification number to each record in the transformed set of data.

6. The process for preparing data for upload to a data warehouse as recited in claim 5, further comprising the step of verifying the existence of templates, an audit initialization file, and the data warehouse.

7. The process for preparing data for upload to a data warehouse as recited in claim 5, further comprising the step of providing an error notification if a record in the transformed data is already contained in the data warehouse.

8. The process for preparing data for upload to a data warehouse as recited in claim 5, further comprising the step of determining beginning and end times for the set of transformed data.

9. The process for preparing data for upload to a data warehouse as recited in claim 5, further comprising the step of loading the unique identification number assigned to each record of the transformed data and the transformed data into the data warehouse.

10. A method for processing operational data received from nodes on a network for storage in a data warehouse comprising the steps of:

integrating the operational data received from the nodes on the network;

producing an output file from the integrated data which contains at least one record;

auditing the output file;

loading the output file onto the data warehouse;

comparing a current status of nodes on the network with a previous status of the nodes during a previous period of time to determine whether the current status is different from the previous status;

forming another output file containing the current status of each node on the network, whether the current status of each node is different from the previous status for that node during the previous period of time, and how long the node has been in the current status;

auditing the another output file; and uploading the another output file into the data warehouse.

11. A system for preparing operational data for upload to a data warehouse comprising:

an integrated network control computer for retrieving and storing data relating to transactions occurring on nodes on a network, wherein said nodes are customer activated terminals; and a data warehouse connected to the integrated network control computer, wherein said data warehouse having a data processor for receiving, transforming, and auditing the data relating to transactions occurring on the nodes;

wherein said data relating to transactions includes data regarding customer activated transactions occurring on the customer activated terminals and data relating to a status of customer activated terminal components; and wherein said data warehouse processor transforms the data relating to transactions occurring on the nodes by determining a local time at which each customer activated transaction occurred, verifying the data associated with each customer activated terminal by using a mnemonic table, determining whether any data relating to a transaction is an orphan, computing a total elapsed time for each transaction and writing the transformed data into an output file comprised of records.

12. A system for preparing operational data for upload to a data warehouse comprising:

an integrated network control computer for retrieving and storing data relating to transactions occurring on nodes on a network, wherein said nodes are customer activated terminals; and a data warehouse connected to the integrated network control computer, wherein said data warehouse having a data processor for receiving, transforming, and auditing the data relating to transactions occurring on the nodes;

wherein said data relating to transactions includes data regarding customer activated transactions occurring on the customer activated terminals and data relating to a status of customer activated terminal components; and wherein said data warehouse processor generates records reporting the availability of nodes on the network by obtaining a previous status of nodes on the network, comparing a current status of nodes with the previous status, determining which nodes have changed status, and forming an output file containing the current, previous, and change statuses of each node.

13. A process for preparing and uploading data into a data warehouse comprising the steps of:

(a) obtaining a set of data from nodes on a network relating to the operation of and transactions occurring on each node and the operation of each node component in elementized message format;

(b) storing the set of data obtained as a series of records on an integrated network control computer;

(c) transmitting the stored set of data to a data warehouse processor;

(d) transforming the transmitted set of data into data base formatted records wherein said transforming step is comprised of:

(i) determining time zone information for data obtained from each node in the network;

(ii) rejecting node data having invalid syntax;

(iii) reporting rejected node data in an audit error log file;

(iv) calculating a local time associated with data obtained from each node by referencing a time zone table;

(v) verifying the data associated with each node by referencing a mnemonic table containing the location of individual node devices by number, name and mnemonic;

(vi) determining whether any data relating to a transaction is an orphan;

(vii) computing a total elapsed time for each transaction;

(viii) writing the transformed data into an output file comprised of records;

(e) auditing the transformed data contained in the output file wherein said transformed data auditing step is comprised of:

(i) verifying existence of templates, an audit initialization file, and the data warehouse (ii) calculating number of records contained in the transformed data;

(iii) determining beginning and end times for the set of data obtained from the nodes on the network;

(iv) determining a load control key by querying the data warehouse for previous load control key and incrementing result of the inquiry by one unit;

(v) querying the data warehouse to determine whether records currently being audited have previously been uploaded to the data warehouse;

(vi) building a load control table management utility containing all instructions necessary for undertaking the current data base load;

(vii) assigning a unique identification number to each record in the transformed set of data;

(viii) building a node table management utility for loading data into the data warehouse and associating a load identification number with the transformed set of data;

(ix) providing an error notification if a record in the transformed set of data was previously loaded into the data warehouse;

(x) loading the unique identification number assigned to each record in the transformed set of data and the transformed data into the data warehouse;

(f) generating records reporting the availability of nodes on the network and node components wherein said generating step is comprised of:

(i) obtaining previous status of nodes and node components;

(ii) comparing current status of nodes and node compodnents with their previous status;

(iii) determining whether the current status of each node in the network or each node component has changed from the previous status of the node or node component;

(iv) determining a length of time each node and each node component has been in a current state;

(v) forming an output file containing the current status of each node component, whether the current state of each node component is different from the status recorded for that node during a previous upload and how long the node component has been in the current state;

(g) auditing records reporting the availability of nodes on the network and node components wherein said record availability auditing step is comprised of:
  (i) counting a number of records reporting the availability of nodes on the network and node components;
  (ii) counting a number of node components that have changed status from previous states of the node components;
  (iii) determining earliest and latest time for the set of records reporting availability of nodes on the network and node components;
  (iv) assigning a unique load identification number to number of records reporting node availability, the number of nodes having changed status and the earliest and latest time for the set of records reporting niode availability;
  (v) producing a load control table management utility providing a set of instructions for loading audit information concerning the records reporting the availability of nodes on the network and node components;
  (vi) producing a load control table management utility providing a set of instructions for loading the records reporting the availability of nodes on the network and node components;
(h) loading the number of records reporting node availability, the number of nodes having changed status, and the earliest and latest time for the set of records reporting node availability and the load control identification number to the data warehouse.

* * * * *

UNITED STATES PATENT AND TRADEMARK OFFICE
CERTIFICATE OF CORRECTION

PATENT NO.    : 6,587,857 B1
DATED         : July 1, 2003
INVENTOR(S)   : Kevin Carothers, Lin-Chen Shih and Simon Khilkevich It is certified that error appears in the above-identified patent and that said Letters Patent is hereby corrected as shown below:

<u>Column 15,</u>
Line 17, please change "niode" to -- node --

Signed and Sealed this

Third Day of May, 2005

JON W. DUDAS
*Director of the United States Patent and Trademark Office*